United States Patent [19]
Hill

[11] Patent Number: 4,593,833
[45] Date of Patent: Jun. 10, 1986

[54] VESSEL HANDLE ATTACHMENT

[76] Inventor: Charles A. Hill, 4641 Mt. Forde Ave., San Diego, Calif. 92117

[21] Appl. No.: 780,208

[22] Filed: Sep. 26, 1985

[51] Int. Cl.⁴ .............................................. B65D 43/26
[52] U.S. Cl. .................................... 220/94 R; 220/95; 220/263; 220/334
[58] Field of Search ............ 220/94 R, 95, 96, 85 CH, 220/263, 334; 16/114 A

[56] References Cited

U.S. PATENT DOCUMENTS

| | | | |
|---|---|---|---|
| 1,677,048 | 7/1928 | Pfeffer | 220/263 |
| 1,765,072 | 6/1930 | Hashimoto | 220/96 |
| 2,460,840 | 2/1949 | Mockabee | 220/94 R X |
| 4,505,390 | 3/1985 | Kirk, Jr. | 220/95 R |
| 4,519,520 | 5/1985 | Hill | 220/95 X |

Primary Examiner—Steven M. Pollard
Attorney, Agent, or Firm—Charmasson & Holz

[57] ABSTRACT

Handle attachment for vessels such as drinking cups formed from a metal stamping, and for lids comprising a hinge-lever integral therewith. Said attachment comprising a rectangular member which extends into a rectangularly perforated tongue with a thin band of metal along its upper edge; and three pairs of tabs along the length of the member which attaches the U-shaped handle to the member.

3 Claims, 3 Drawing Figures

VESSEL HANDLE ATTACHMENT

FIELD OF THE INVENTION

The present invention relates to handle attachment devices used to connect a detachable handle and a lid to a stamped vessel.

BACKGROUND OF THE INVENTION

The closest of prior art known to the applicant which relates to the instant invention is Hill, U.S. Pat. No. 4,519,520, which relates to a lid attachment for a stamped vessel having a rim formed by crimping the vessel lid around a length of wire.

SUMMARY OF THE INVENTION

It is the primary purpose of the present invention to provide a very simple and inexpensive attachment means for connecting the lid and the handle to the vessel.

It is another purpose of the present invention to provide means for storing the detached handle beneath the vessel.

It is yet another purpose of the present invention to make the vessel more compact for an easier packing in a container of limited volumes.

DESCRIPTION OF THE PREFERRED EMBODIMENT OF THE INVENTION

Figure 1:
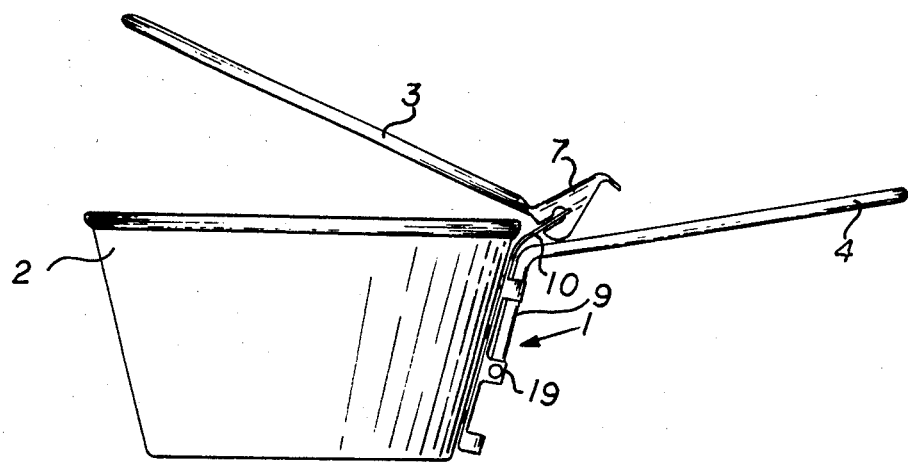
FIG. 1 shows an elevational side view of the preferred embodiment with the handle and lid attached to the vessel.
Figure 2:
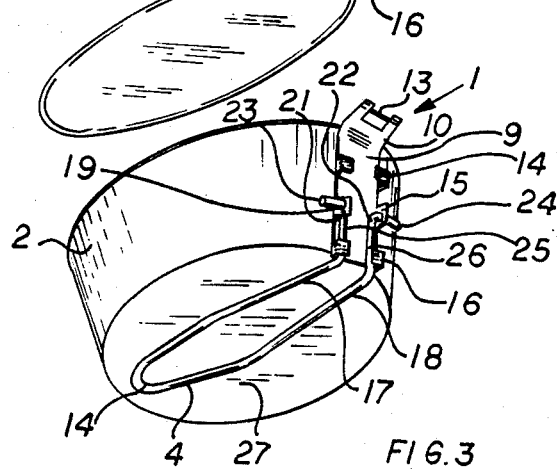
FIG. 2 shows a partial top plan view of the lid attached to the vessel by means of the instant invention.
Figure 3:
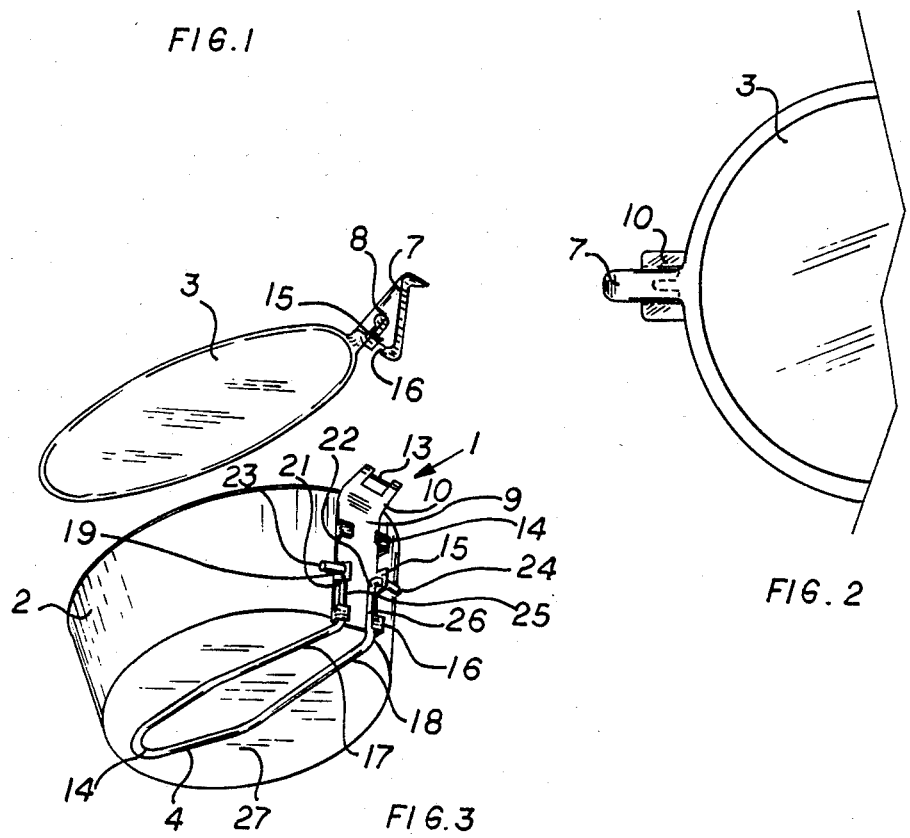
FIG. 3 shows a perspective view of the preferred embodiment with the detached lid and the handle stored beneath the vessel.

The improved vessel handle attachment 1 shown in FIGS. 1, 2 and 3 is intended for use on a stamped vessel 2 such as a drinking cup, to connect a lid 3 and a handle 4 to said vessel 2. The lid 3 incorporates a hinge-lever 7 on its periphery, formed simultaneously with the lid 3 in a single stamping. Said hinge-lever 7 comprises two parallel slotted tabs 8.

The vessel attachment 1 comprises a rectangular member 9 welded along the depth of the vessel 2, at its outer surface. The member 9 extends into a rectangular tongue 10 at an angle therewith. This tongue 10 is rectangularly perforated to leave a thin band of metal 13 along its upper edge.

The member 9 also comprises three pairs of tabs 14, 15 and 16, that protrude from either side of the member 9. As shown in FIG. 3, one pair of tabs 15 is located at about the middle of the member 9, having one hole 19 in the center of each tab. The other two pairs of tabs 14 and 16, are located at either side of the pair 15 and symmetrically thereto. Said pairs 14 and 16 having their outer edges bent inwardly.

The member 9, the tongue 10, the band 13 and the three pairs of tabs 14, 15 and 16 are simultaneously made in a single stamping.

The detachable handle comprises a U-shaped loop 14, whose ends 17 and 18 extend into a pair of identical and coplanar L-shaped legs 21 and 22. The plane of said legs 21 and 22 being nearly orthogonal to the plane of the loop 14.

When in use, slots 15 and 16 of the hinge-lever 7 fit snugly over the thin band of metal 13. Hinge-lever 7 forms a raised lever when said lid rests on the rim of the vessel. By pressing down on hinge-lever 7, the band 13 acts as a fulcrum and the lid is raised.

The handle 4 is connected to the vessel 2 by first pinching the two ends 17 and 18 of the U-shaped loop 14, and then by inserting the horizontal ends 23 and 24 of the legs 21 and 22 into the holes 19. With the loop 14 still pinched, the vertical ends 25 and 26 of the legs 21 and 22 are engaged beneath the bent outer edges of the first pair of tabs 14.

In order to pack the handle 4, the two ends 17 and 18 of the loop 14 are pinched and the vertical ends 25 and 26 disengaged from the first pair of tabs 14. With the horizontal ends 23 and 24 still inserted in the holes 19, and the ends 17 and 18 still pinched, the handle 4 is then rotated around the second pair of tabs 15, so that the loop 14 rests against the outer bottom surface 27 of the vessel 2, and the vertical ends 25 and 26 engages beneath the bent outer edges of the third pair of tabs 16.

What is claimed is:

1. An improved handle attachment of the type used to connect a detachable handle and a lid to a vessel formed from a metal stamping, said lid comprising a hinge-lever integral with said lid having two parallel slotted tabs, wherein the improvement comprises:
   a member of a generally rectangular shape, welded depthwise to the outer surface of said vessel;
   a tongue of a generally rectangular shape, integral with the top of the member, and extending upwardly and angularly therefrom;
   said tongue being rectangularly perforated to leave a thin band of metal along its upper edge;
   a first and second pairs of tabs, of a generally rectangular shape, integral with the member and protruding outwardly and orthogonally therefrom;
   said second pair of tabs being located at about half the depth of the vessel, and dorsally at each side of the member, each tab of said second pair having a hole in the middle thereof;
   said first pair of tabs being located near the tongue and dorsally at each side of the member, each tab of said first pair having its outer edge bent inwardly; and
   a detachable handle comprising:
   a U-shaped loop;
   a pair of identical and coplanar L-shaped legs extending from the end of said loop and nearly orthogonally to the plane thereof; and
   said legs being shaped and dimensioned so that their ends engage the holes of said second pair of tabs, and fit beneath the bent outer edges of said first pair of tabs.

2. The device claimed in claim 1, which further comprises a third pair of tabs, dorsally mounted at each lower side of the member, near the bottom of the vessel, said third pair being identical to the first pair and symmetrical thereto with respect to a plane orthogonal to the plane of said member and passing through a line which joins the centers of the holes.

3. The device claimed in claim 2 wherein said hinge forms a raised lever, using said band as a fulcrum.

* * * * *